US009817378B2

(12) United States Patent
St. Mars et al.

(10) Patent No.: US 9,817,378 B2
(45) Date of Patent: Nov. 14, 2017

(54) HVAC CONTROLLER INTERFACE DEVICE

(71) Applicant: Ingersoll-Rand Company, Davidson, NC (US)

(72) Inventors: Richard Craig St. Mars, Tyler, TX (US); Bryan Richard Teichgraeber, Tyler, TX (US); Arvind Chitrala, Tyler, TX (US); Ray Weaver, Tyler, TX (US)

(73) Assignee: Trane International Inc.

( * ) Notice: Subject to any disclaimer, the term of this patent is extended or adjusted under 35 U.S.C. 154(b) by 580 days.

(21) Appl. No.: 14/480,347

(22) Filed: Sep. 8, 2014

(65) Prior Publication Data

US 2015/0073605 A1 Mar. 12, 2015

Related U.S. Application Data

(60) Provisional application No. 61/875,022, filed on Sep. 7, 2013.

(51) Int. Cl.
| | | |
|---|---|---|
| *G01M 1/38* | (2006.01) | |
| *G05B 15/02* | (2006.01) | |
| *G05D 23/19* | (2006.01) | |
| *F24F 11/00* | (2006.01) | |

(52) U.S. Cl.
CPC .......... *G05B 15/02* (2013.01); *F24F 11/0086* (2013.01); *G05D 23/1902* (2013.01); *F24F 2011/0091* (2013.01)

(58) Field of Classification Search
CPC ...................................................... G05B 15/02
USPC ................................................. 700/275–306
See application file for complete search history.

(56) References Cited

U.S. PATENT DOCUMENTS

| | | | | |
|---|---|---|---|---|
| 6,554,672 | B2* | 4/2003 | Dunham | ................. H01J 9/261 313/495 |
| 7,092,794 | B1* | 8/2006 | Hill | ....................... G08C 17/02 700/108 |
| 2006/0041335 | A9* | 2/2006 | Rossi | ................. G05B 23/0235 700/276 |
| 2009/0018673 | A1* | 1/2009 | Dushane | .............. G05B 19/042 700/9 |
| 2009/0090115 | A1* | 4/2009 | Boydstun | ............. F24F 11/0086 62/126 |

OTHER PUBLICATIONS

Colak, Ilhami, et al. "Remote controlling and monitoring of HVAC system over Internet." (2008).pp. 680-684.*

(Continued)

*Primary Examiner* — Satish Rampuria
(74) *Attorney, Agent, or Firm* — Taft, Stettinius & Hollister LLP

(57) ABSTRACT

A handheld controller interface device that receives communications from one or more components of an HVAC system. The controller interface device is removably secured to an enclosure of the HVAC system. When not being engaged by a user, the controller user interface may be secured within the enclosure in a mounted position. When the HVAC system is being serviced, the controller user interface may be removed from the enclosure so as to be in an unmounted position. Further, when in the unmounted position, the controller interface device still at least receives communications from one or more components of the HVAC system, including, for example, a controller.

17 Claims, 6 Drawing Sheets

(56) References Cited

OTHER PUBLICATIONS

Hutzel, William J. "A remotely accessed HVAC laboratory for distance education." International Journal of Engineering Education 18.6 (2002): pp. 711-716.*

Huang, Hsiao-Yi, et al. "Development of an intelligent energy management network for building automation." IEEE Transactions on Automation Science and Engineering 1.1 (2004): pp. 14-25.*

* cited by examiner

HVAC CONTROLLER INTERFACE DEVICE

CROSS REFERENCE TO RELATED APPLICATIONS

The present application claims the benefit of U.S. Provisional Patent Application Ser. No. 61/875,022, filed Sep. 7, 2013, which is incorporated herein by reference in its entirety.

BACKGROUND

Embodiments of the present invention generally relate to heating, ventilation and air conditioning systems (HVAC). More particularly, embodiments of the present invention relate to a handheld, dedicated and removable controller interface device for HVAC systems.

HVAC controller interface devices may be utilized for a variety of different reasons, including for example, providing an indication of the operating condition, and/or diagnosing malfunctions, of an HVAC system. Typically, such diagnostic systems are constrained inside a cabinet of a component of the HVAC system. For example, HVAC controller interface devices are often intended to be permanently secured inside a cabinet, such as, for example, by securing the interface to the cabinet using sheet metal screws. Yet, permanently securing the interface inside the cabinet may restrict, or otherwise impede with, the ability of at least a technician to interact with the interface. For example, the interface may be permanently secured to the cabinet at a location that is relatively physically demanding for the technician. Additionally, the interface may also be permanently positioned at location that is difficult to view by the technician and/or is partially obscured from view. Such restrictive access to the interface can result in increased technician service time for a given system, and thus added expense for the system's owner.

Additionally, attempts to manipulate the positioning of a permanently secured interface may cause the loosening or breakage of components that are utilized to retain the interface at a single position relative to the cabinet. Further, the loosening or breakage of such components may facilitate the displacement of those components to other areas of the cabinet and/or within the system. Yet, as at least some of those displaced components are often constructed from metallic materials, the displacement of those components to other areas of the cabinet and/or system may cause electrical shortages within the cabinet, thereby interfering with the operation of the system and/or creating additional issues for the servicing technician.

BRIEF SUMMARY

An aspect of the present invention is an HVAC system having a controller that is operably coupled to an enclosure, the controller being adapted to control at least the operation of at least one component of the HVAC system. The HVAC system further includes a controller interface device that is adapted to be removable between a mounted position and an unmounted position, the controller interface device being securely mounted to the enclosure when in the mounted position. Additionally, the controller interface device is displaced away from the enclosure when in the unmounted position. The controller interface device may also be adapted to receive communications from the controller relating to an aspect of the HVAC system at least when the controller interface device is in the unmounted position.

Another aspect of the present invention is an apparatus for an HVAC system that includes a controller that is in communication with at least one component of the HVAC system. The HVAC system also includes a housing that encompasses at least a portion of the controller. Additionally, the HVAC system includes a controller interface device that is in communication with the controller. The HVAC system further includes a means for detachably retaining the controller interface device within the housing.

Another aspect of the present invention is an apparatus that includes a controller that is in communication with at least one of a refrigerant compressor, a furnace blower motor, a furnace ignition system, and a refrigerant condenser fan. The apparatus also includes an enclosure that houses at least a portion of the controller. Additionally, the apparatus includes a controller interface device that has a display and a user input and is in communication with the controller. Further, the controller interface device is removably coupled to a mounting portion located within the enclosure. The controller interface device is also adapted to remain in communication with the controller when the controller interface device is removed from the enclosure.

Additionally, an aspect of the present invention is a unique HVAC controller interface device. Other embodiments include apparatuses, systems, devices, hardware, methods, and combinations for a controller interface device in electronic communication with an HVAC controller. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

Figure 1:
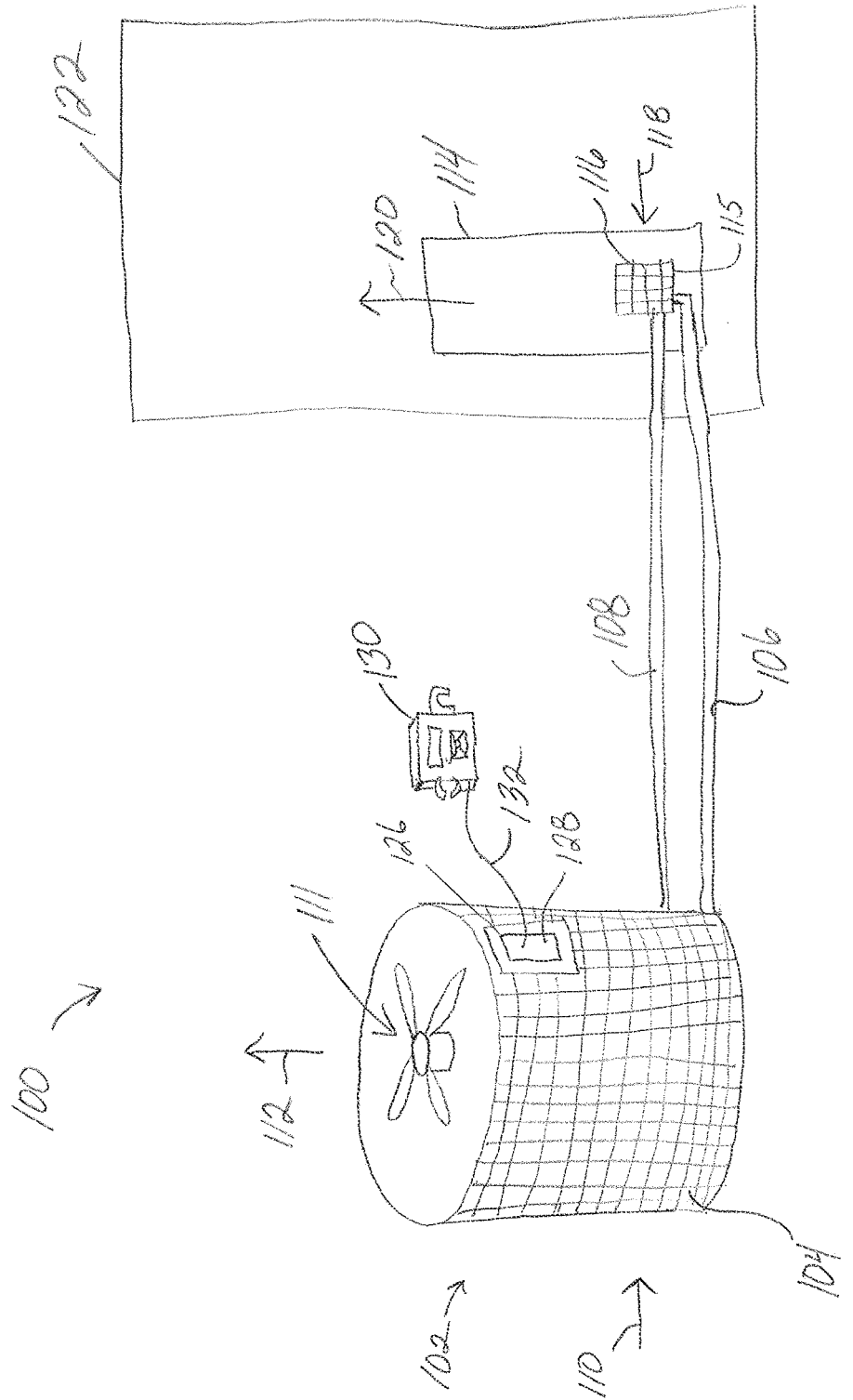
FIG. 1 illustrates a schematic diagram of an HVAC system including a handheld controller interface device according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates one embodiment of a heating, ventilation, and air conditioning (HVAC) system 100 that is utilized to provide heating, ventilation, and air conditioning to a structure 122. The system 100 may include an outdoor heat exchanger 104 and an indoor heat exchanger 116. The indoor heat exchanger 116 can be an evaporator 115 that may be included in an indoor assembly 114, such as, for example, a furnace assembly, among other types of assemblies. According to certain embodiments, the indoor assembly 114 can include an air blower (not shown). Air 118 from within the structure 122 can be blown across the evaporator 115 by the air blower to provide a conditioned airflow 120. Once the air 118 has been conditioned, the conditioned airflow 120 can be recirculated back into the structure 122. Additionally, a refrigerant may be compressed by a compressor (not shown) and delivered to the evaporator 115 via a high pressure line 108. Compressed refrigerant in the evaporator 115 may at least partially change phase from a liquid to a gas as the refrigerant extracts heat from at least a portion of the air 118 that is blown across the evaporator 115. The gaseous refrigerant released from the evaporator 115 may then return to the compressor via a low pressure line 106.

According to certain embodiments, the outdoor heat exchanger 104 is a condenser that is incorporated into an outdoor unit 102, such as, for example, an air conditioner unit, among other types of outdoor units. Further, according to certain embodiments, the outdoor unit 102 may house the compressor. After the refrigerant is compressed, the refrigerant can flow through the condenser, where an ambient air stream 110 may remove heat from the compressed refrigerant, with the heated air stream 110 being exhausted into ambient as heated air 112. Additionally, according to certain embodiments, a fan assembly 111 can assist with directing airflow across the condenser.

While the HVAC system 100 is described herein as a central air system, the application is not meant to be limited thereto. Moreover, any HVAC system 100 that can heat and/or cool a structure 122 is contemplated by the present application. Exemplary HVAC systems 100 include, but are not limited to, a stand-alone air conditioning unit, a stand-alone furnace, a heat pump, and/or any other heating or cooling device(s) capable of heating or cooling a structure 122. Additionally, a variety of different types of structures, as well as structures having a variety of different uses, may be employed. For example, the structure 122 can include, but is not limited to, residential or commercial buildings, as well as any other structures 122 that may utilize a heating and/or cooling system or device.

Figure 3:
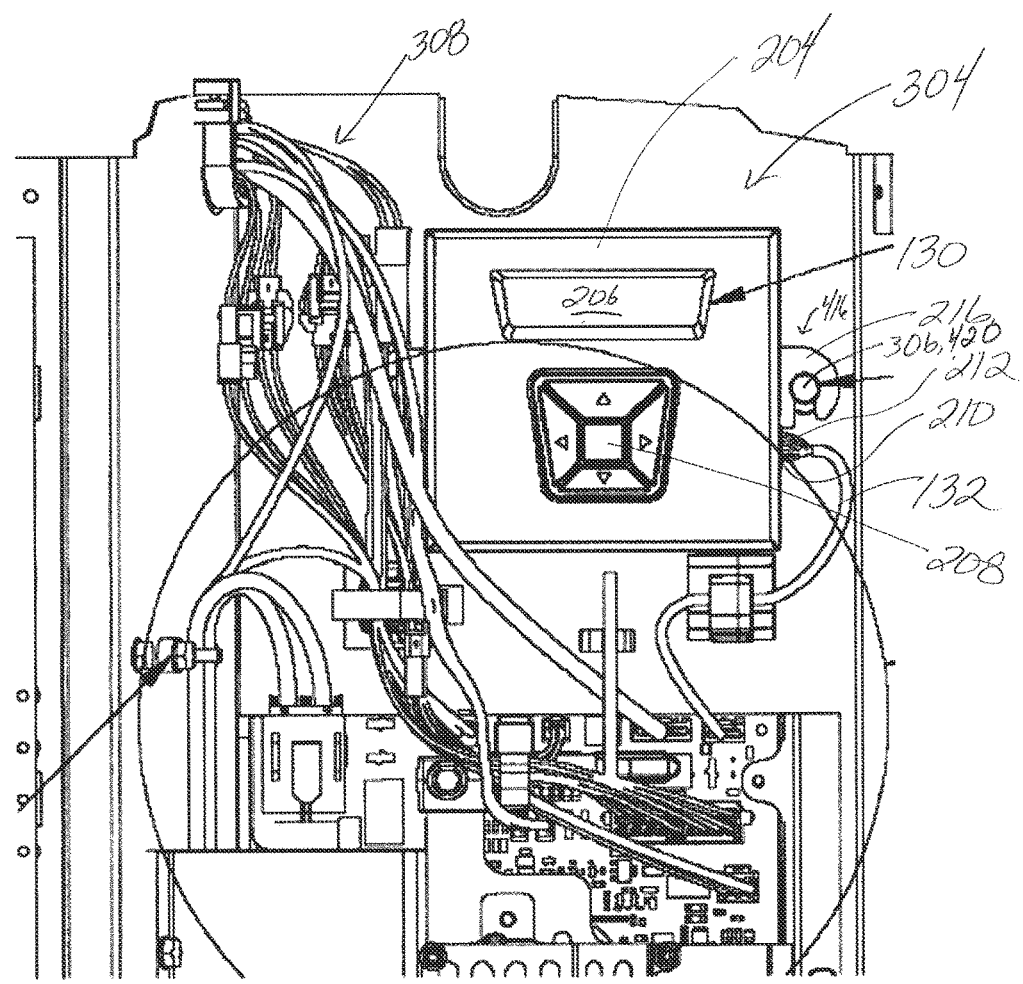
FIG. 3 illustrates a front view of the handheld controller interface device depicted in FIG. 2 removably mounted to an HVAC controls cabinet.

According to certain embodiments, the HVAC system 100 includes a controller 128 that can be housed in a cabinet, housing, or enclosure 126. The controller 128 may be configured to control various aspects of the HVAC system 100, including, for example, fan motor speed, air blower motor speed and operation, compressor operation, and/or operations performed in response to a thermostat input (e.g. switching from heating to cooling and/or maintaining a structure 122 within a predetermined temperature range), and the like. For example, as shown in FIG. 3, the controller 128 may be interconnected to a plurality of wires 308 that place the controller 128 in electronic communication with a plurality of HVAC devices of the system 100. However, it is additionally contemplated that various HVAC components, including, but not limited to, a thermostat, may communicate with the controller 128 wirelessly.

Additionally, the controller 128 may be positioned at a variety of locations within the HVAC system 100 and/or be a part of a number of different components within the HVAC system 100. For example, according to the illustrated embodiment, the controller 128 may be positioned within, and/or included with, the outdoor unit 102. However, according to other embodiments, the controller 128 may be positioned within, and/or included with, the indoor unit 114. Further, according to certain embodiments, both the outdoor unit 102 and the indoor unit 114 can have separate controllers 128, or the controller 128 can be disposed at any location such that at least one HVAC component is controlled by the controller 128.

The system 100 may also include a controller interface device 130 that is adapted to at least receive information from, and/or exchange information with, the controller 128. According to the illustrated embodiment, the controller interface device 130 is adapted to allow a user, such as, for example, a service technician, to evaluate the operating status of the HVAC system 100, including diagnosing and/or troubleshooting various aspects of the condition of the HVAC system 100. For example, according to certain embodiments, the controller interface device 130 can receive various types of data from the controller 128, including, but not limited to, data that is indicative of controller 128, such as a model or serial number, various parts numbers associated with the HVAC system 100, contact information for technical assistance, hours in service, power consumption, and/or various diagnostic codes which can be stored on the controller 128 and read by the controller interface device 130, among other types of data. Additionally, according to certain embodiments, the controller interface device 130 is adapted to send signals to the controller 128, such as, for example, signals that initiate various test modes or protocols, or that alter or adjust various controller settings, among other types of signals.

Figure 2:
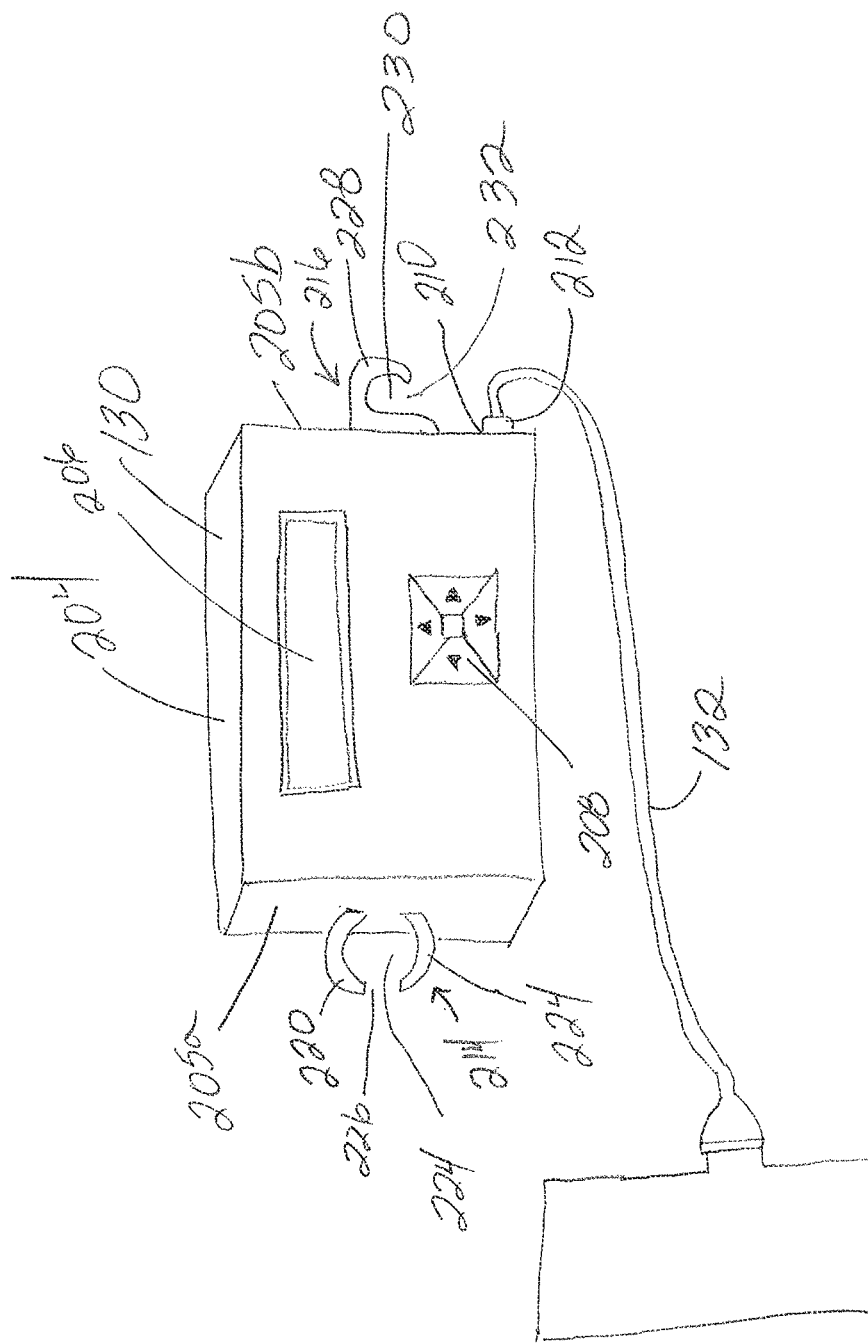
FIG. 2 illustrates an exemplary handheld controller interface device including retention members according to an illustrated embodiment of the present invention.

The controller interface device 130 may receive information from, and/or communicate information to, the controller 128 in a variety of different manners. Communications to and/or from the controller 128 may take a variety of different forms, and may occur in a variety of different manners. For example, as shown by at least FIGS. 1, 2, and 6, the controller interface device 130 may be hardwired to controller 128, such as, for example, being electrically connected to the controller 128 through a link 132. The link 132 may be operably connected to the controller 128, such as, for example, as shown in FIG. 2, by a connection between the link 132 and the controller 128 at location 202. According to such embodiments, communications to and/or from the controller 128 and/or the controller interface device 130 may be transmitted through the link 132. According to certain embodiments, the link 132 may also be configured to provide a tethered type connection between the controller 128 and the controller interface device 130 that permits, removal, and, to a degree, at least handheld displacement, of the controller interface device 130 away from a mounted position in a cabinet 126, and more particularly, to an unmounted position away from the cabinet 126.

Figure 6:
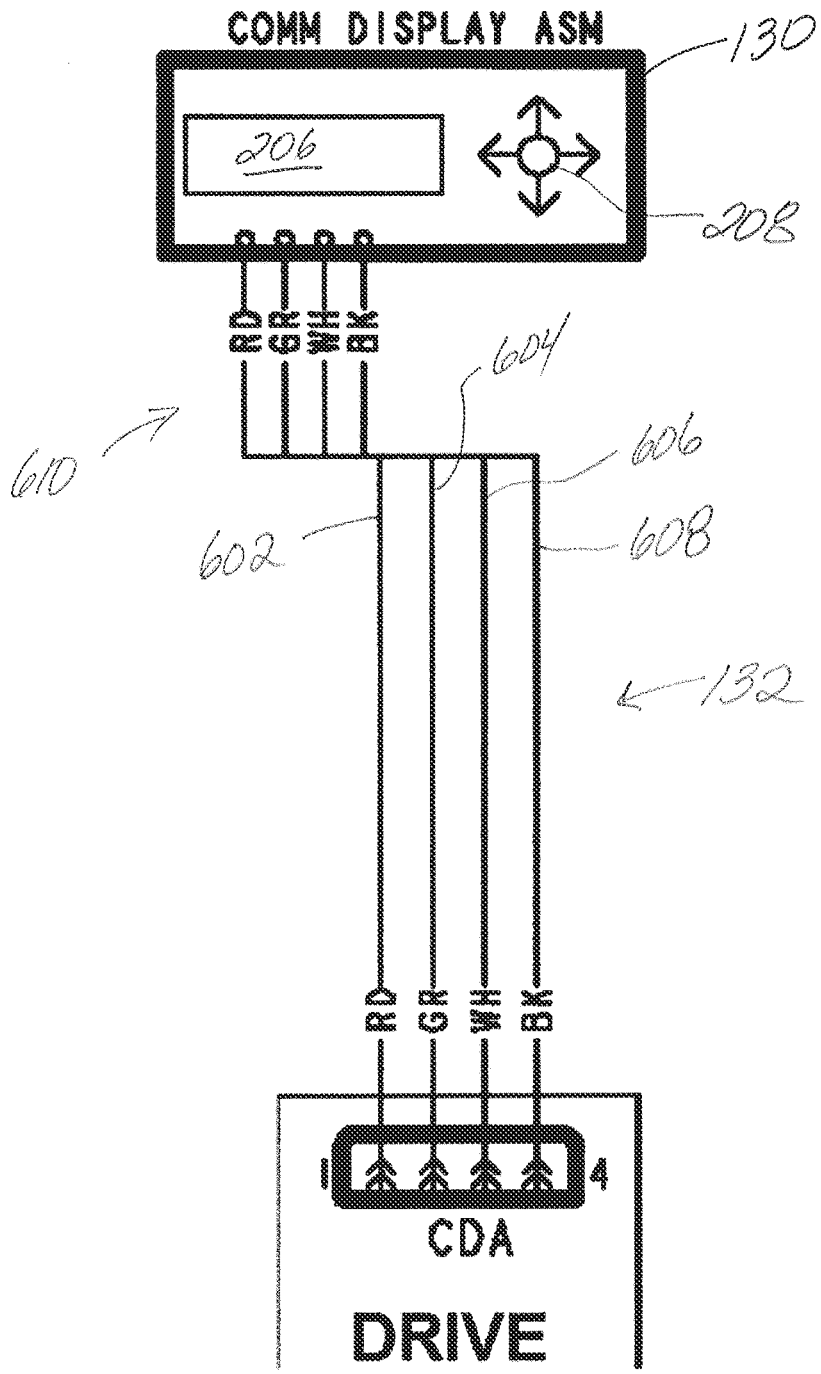
FIG. 6 illustrates a schematic diagram of one embodiment of a link for interconnecting the controller interface device to a controller according to an illustrated embodiment of the present invention.

According to certain embodiments, the link 132 can be of an analog, digital, or other configuration such that the controller interface device 130 is placed in electronic communication with the controller 128. Additionally, the link 132 may have a variety of different configurations and forms, including, for example, being of different types of cables and/or wires that allow for the transfer of signals, information, data, voltage, or the like from and/or between the controller 128 to the controller interface device 130. For example, FIG. 6 illustrates one possible configuration of the link 132 in which the link 132 includes an analog configuration 610. According to such an embodiment, the analog configuration can include a positive interface 602, a negative interface 608, a ground 604, and a neutral 606.

Alternatively, according to certain embodiments, the controller 128 may be in communication with the controller interface device 130 via a wireless communication protocol, such as, for example, Bluetooth, among other wireless protocols. According to such embodiments, the controller 128 and the controller interface device 130 may include, or be operably connected to, an antenna and/or transceiver that allow at least for the transfer of data or information from controller 128 to the controller interface device 130, and which may also, according to certain embodiments, allow for the transfer of information from the controller interface device 130 to the controller 128.

Additionally, according to certain embodiments, the controller interface device 130 is a dedicated device for the HVAC system 100. For example, according to certain embodiments, the controller interface device 130 may have functionality that is generally limited to the operation of the HVAC system 100, including, diagnosing or troubleshooting the operation, and/or troubleshooting, of the HVAC system 100. Further, the controller interface device 130 may include one or more different processing devices that may be of a programmable variety that executes algorithms and processes data in accordance with an operating logic as defined by programming instructions (such as software or firmware) stored in a memory of those processing devices.

According to certain embodiments, the controller interface device 130 is removably secured to the cabinet 126 of the HVAC system 100. Further, the controller interface device 130 may be configured to be a handheld device. Thus, when the controller interface device 130 is to be engaged, such as, for example, during scheduled maintenance service, diagnostic analysis, or at another time when the controller 128 is to be accessed, the controller interface device 130 may be removed from the cabinet 126, such as, for example, by being grabbed and moved by a hand(s) of a user. Moreover, according to certain embodiments, the controller interface device 130 may be sized to permit the controller interface device 130 to be grasped with one hand of a user, and to allow data to be inputted, or other operable engagement with, an input device 208 of the controller interface device 130 with the same or other hand.

Additionally, according to certain embodiments in which the controller interface device 130 is operably connected to the controller 128 via the link 132, the link 132 may be of sufficient length such that the controller interface device 130 can be removed from the cabinet 126 while an electrical connection between the controller interface device 130 and the controller 128 is still maintained via the link 132. However, as previously discussed, according to other embodiments, rather than utilizing a tethered arrangement that may be provided by use of the link 128, the controller interface device 130 may receive communications from, and/or may transmit communications to, the controller 128 via a wireless communication protocol.

Referencing FIG. 2, according to the illustrated embodiment, the controller interface device 130 can include a display screen 206 that, in addition to the input device 208, is operably secured to and/or within a housing 204. A variety of different displays may be used for the display screen 206, including, but not limited to, a pixelated display, liquid crystal display, or any other display capable of providing a visual output, such as a diagnostic code, serial number, or the like as were aforementioned. Further, as previously discussed, the input device 208 is configured to receive user input or selections. For example, according to certain embodiment, the input device 208 may include a plurality of keys, a single key, or a toggle switch, among other types of input devices. Further, the input device 208 may assist with a user being able to browse through various codes, activate a test mode and/or protocol, and/or send a signal, protocol, or any other communication to the controller 128 or browse through any data stored in or received from the controller 128. Additionally, the display screen 206 and the input device 208 can be separate devices, as illustrated, or can be integrated into a single unit.

The housing 204 may be sealed so as to at least attempt to protect the housing 204 and/or the components therein from outside elements, including, for example, moisture and debris. For example, as indicated by FIG. 1, the controller interface device 130 may be positioned in or on components of the system 100 that may be exposed to conditions that are not desirable for electronic components, including, for example, rain, condensate, high humidity, temperature fluctuations, and dust, among other conditions or elements. Thus, according to certain embodiments, the wiring harness for the link 132 can be contained within the housing 204 such that the link 132 enters the housing 204 at a location 210 that can include a seal 212 between the link 132 and the housing 204 and/or the controller interface device 130. According to certain embodiments, the link 132 can interface with the controller interface device 130 through a sealed connection, or any other suitable fashion depending upon the specific application. Additionally, according to certain embodiments, the display 206, input device 208, wiring harness for the link 132, and any other internal electronics or components of the controller interface device 130 can be at least partially hermetically sealed with, or within, the housing 204.

Referencing FIGS. 2-5, the controller interface device 130 can be removably mounted or secured to an inner portion 304 of the cabinet 126. Such mounting of the controller interface device 130 may be configured to relatively securely maintain the controller interface device 130 in a mounted position to the cabinet 126. According to certain embodiments, the controller interface device 130 may be operably secured to the cabinet 126 via a mounting device 416. The mounting device 416 may have a first component 418 that is operably coupled to the cabinet 126, and a second component 420 that is operably coupled to the controller interface device 130. A variety of different types of mounting devices 416 may be employed. For example, according to certain embodiments, the mating first and second components 418, 420 may provide a hook and mating engagement surface or aperture, magnets of opposing polarities, and/or hook and loop material, among other types of connections. For example, the first component 418 may provide a hook or protrusion that extends from the cabinet 126 and that mates with the second component 420 of the controller interface device 130, the second component 420 being an orifice, recess, aperture, and/or protrusion that receives the insertion of, or otherwise engages, at least a portion of the first component 418.

According to the illustrated embodiment, the second component 420 of the mounting device 416 may comprise first and second retainer or slotted members 214, 216 that are positioned on opposing sides 205a, 205b of the housing 204. Additionally, as depicted, the first component 418 may comprise first and second mounts 302, 306 that are configured to operably engage the first and second retainer members 214, 216, respectively. Moreover, according to the illustrated embodiment, the retainer members 214, 216 are removably secured to the two mounts 302, 306 such that axial movement of the controller interface device 130 is restrained. The first and second mounts 302, 306 of the first component 418 can be mounted directly or indirectly to the inner portion 304 of the cabinet 126 and extend outwardly from the cabinet 126 to allow for ease of access for the controller interface device 130, or can be coupled to the cabinet 126 through any other suitable manner. When the controller interface device 130 is mounted within the cabinet 126, and thus in the mounted position, a cabinet cover (not shown) can enclose the controller interface device 130, controller 128, and other electronic components housed within the cabinet 126.

The mounts 302, 306 and the retainer member 214, 216 can be constructed in any manner such that the first retainer member 214 is received by, and rotatably engaged on, the first mount 302. Further, upon rotation of the first retainer member 214, and therefore the user interface device 130, about the first mount 302, the second retainer member 216 is received by the second mount 306. For example, in the illustrated embodiment, the mounts 302, 306 are captive screws. The captive screws can be constructed of a non-conductive material, including but not limited to plastic, polymers, and the like. Such construction can aid in the prevention of a short or other electrical malfunction should a captive screw be dropped within the cabinet 126 and/or displaced to other portions of the system 100.

In the illustrated embodiment, the first retainer member 214 has an upper portion 220 and a lower portion 222 that each extend away from a first sidewall 205a of the housing 204, and which generally define a first inner region 224. Further, at least a portion of the upper and lower portions 220, 222 may be separated from each other by an first inlet region 226 that provides a passageway that leads to the first inner region 224. During use, the controller interface device 130 may be displaced such that the first inlet region 226 receives at least a portion of the first mount 402, such as a portion of an exposed portion of a captive screw, as the user device 130 is in the process of being secured to the cabinet 126. According to certain embodiments, the first inlet region 226 may be sized such that the upper and lower portions 220, 222 at least partially bend, deflect, or deform as the first inlet region 224 moves pass the first mount 302 and/or while the first mount 302 is being received in the first inner region 224. However, according to other embodiments, the upper and lower portions 220, 222 may generally not be bent, deflected, or deformed when the first inner region 224 is positioned about the first mount 302. Alternatively, according to other embodiments, the upper and lower portions 220, 222 may continue to be bent, deflected, or deformed by engagement with the first mount 302 when at least a portion of the first mount 302 is positioned within the first inner region 224 so as to provide a clamping or compressive force against first mount 302. Further, the first inner region 224 is sized to allow at least partial rotational displacement of the first retainer member 214, and thus the controller interface device 130, about at least a portion of the first mount 302, as indicated, for example, by rotational direction 414 in FIG. 4. Such a configuration may the first retainer member 214 to be operably positioned about a shaft of the captive screw of the first mount 302 when the controller interface device 130 is being secured to the cabinet 126 without the associated first mount 302 being fully removed from the cabinet 126.

The second retainer member 216 includes a body segment 228 that generally defines a second inner region 230 and has a second inlet region 232. The location of the second inlet region 232 on the second retainer member 216 may be angularly offset from the corresponding position of the first inlet region 226 on the first retainer member 214. For example, as shown at least in FIG. 2, the second inlet region 232 may be positioned on the second retainer member 216 at a location that is approximately 90° offset from the corresponding position of the first inlet region 226 on the first retainer member 214. Further, the second inlet region 232 provides a passageway that leads to the second inner region 230. During use, after the first retainer member 214 has operably engaged the first mount 302, the controller interface device 130 may be rotatably displaced in direction such that the second inlet region 232 is positioned to receive at least a portion of the second mount 306, such as, for example, a portion of a second captive screw. According to certain embodiments, the second inlet region 232 may be sized, such that at least a portion of the body segment 228 at least partially bends, deflects, or deforms as the second inlet region 232 moves pass the second mount 306 and/or while the second mount 306 within the second inner region 230. However, according to other embodiments, the body segment 228 may generally not be bent, deflected, or deformed when the second inner region 230 is positioned about the second mount 306. Alternatively, according to other embodiments, the body segment 228 may continue to be bent, deflected, or deformed by engagement with the second mount 306 so as to provide a clamping or compressive force against second mount 306. Thus, the second retainer member 216 may be configured such that the second retainer member 216 may be positioned about the second mount 306 when the controller interface device 130 is being secured to the cabinet 126 without the associated second mount 306 being fully removed from the cabinet 126.

Figure 4:
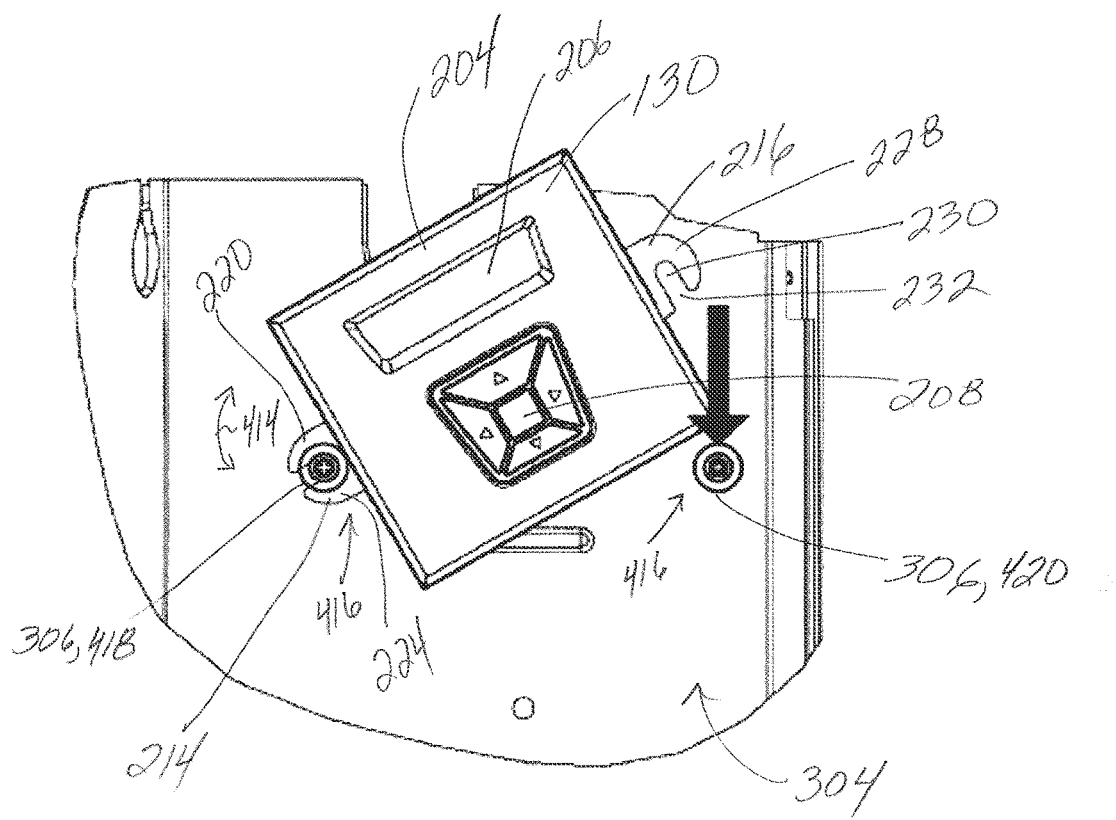
FIG. 4 illustrates a front view of the controller interface device depicted in FIGS. 2 and 3 being mounted to an HVAC controls cabinet according to an illustrated embodiment of the present invention.

FIG. 4 provides an illustration of the controller interface device 130 being mounted to the cabinet 126 according to the depicted embodiment. As shown, the first and second mounts 302, 306 may be positioned relative to the cabinet 126 so that a portion of the mounts 302, 306 is positioned to be engaged by the retainer members 214, 216. For example, according to the illustrated embodiment in which the mounts 302, 306 are captive screws, at least a portion of a shaft of each captive screw is exposed for securable engagement with the associated retainer member 214, 216. According to such an embodiment, the first retainer member 214 may be positioned about at least a portion of the exposed shaft of the first captive screw of the first mount 302. Moreover, the controller interface device 130 may be displaced such that at least a portion of the exposed shaft of the first captive screw of the first mount 302 is received in the first inner region 224 of the first retainer member 214. Further, according to the illustrated embodiment, the first retainer member 214 may be generally positioned between a head of the first captive screw of the first mount 302 and the cabinet 126, which may prevent the first retainer member 214 from being slid along the longitudinal central axis of the first mount 302 to a position in which the first mount 302 may be released from the first inner region 224 of the first retainer member 214.

Figure 5:
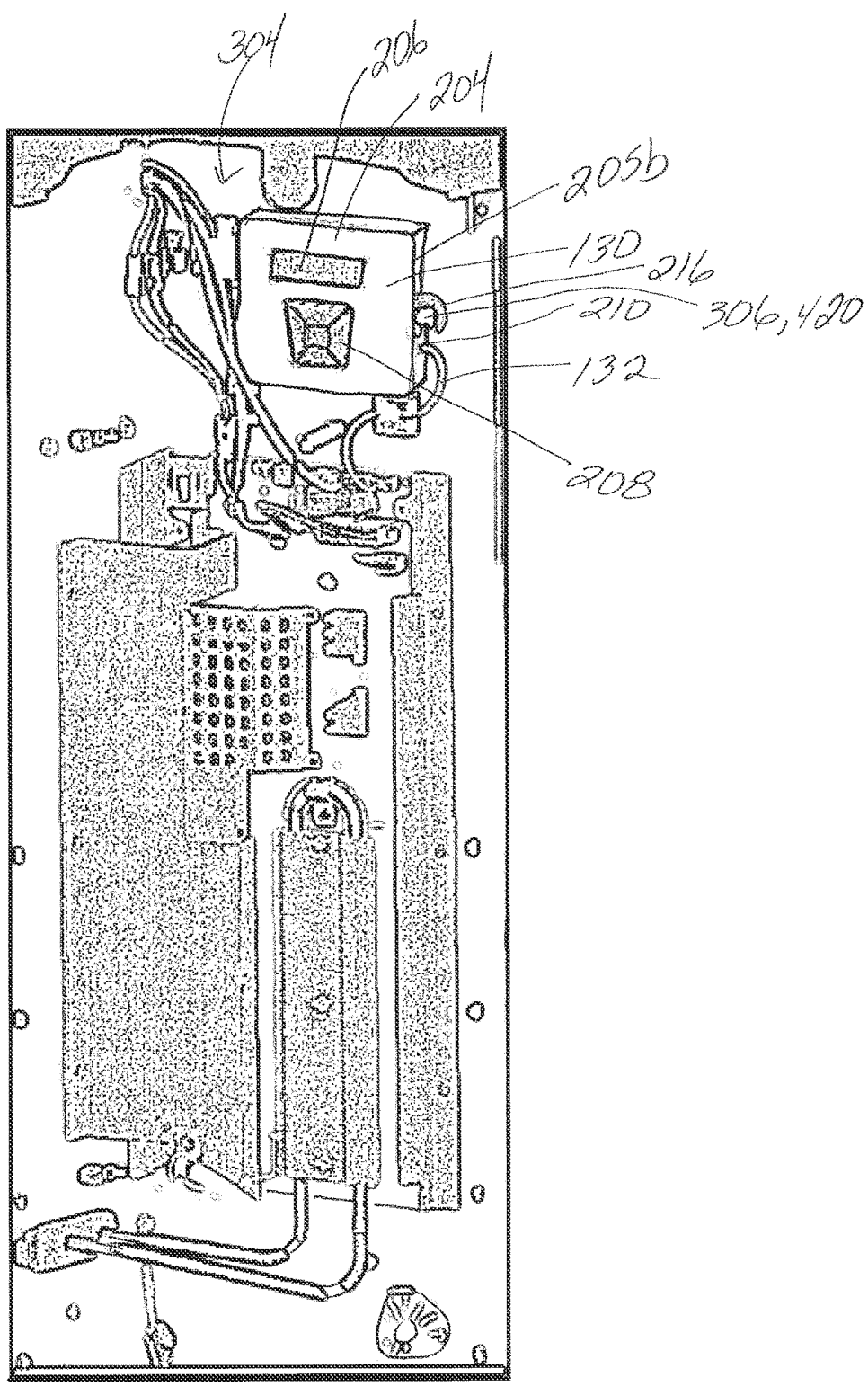
FIG. 5 illustrates a side perspective view of the controller interface device shown in FIG. 4 installed within an HVAC controls cabinet.

With the first retainer member 214 operably engaging the first mount 302, the controller interface device 130 may be rotatably displaced about the first mount 302 so that the second retainer member 216 is generally displaced downward toward the second mount 306, as illustrated, for example, in FIG. 5. In the illustrated embodiment, the controller interface device 130 may continue to be rotatably displaced so that at least a portion of the exposed shaft of the second captive screw of the second mount 306 is received in the second inlet region 232 of the second retainer member 214 and subsequently received into the second inner region 230. Further, similar to the first retention member 214, according to the illustrated embodiment, with the second retainer member 216 positioned about the exposed shaft of the second captive screw of the second mount 306, the second retainer member 216 may be generally positioned between a head of the second captive screw and the cabinet 126, which may prevent the second retainer member 216 from being slid along the longitudinal central axis of the second captive screw to a position in which the second mount 306 may be released from the second inner region 230 of the second retainer member 216. Additionally, according to certain embodiments in which the first and second mounts 302, 306 are first and second captive screws, respectively, with the first and second retainer members 214, 216 operably positioned about the associated exposed portions of the shafts of the first and second captive screws, the first and second captive screws may be tighten to compress the first and second retainer members 214, 216 between the cabinet 126 and the heads of the respective first and second captive screws.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A Heating, Ventilation, and Air Conditioning (HVAC) system comprising:
   a controller enclosed in a housing and operably coupled to an enclosure, the controller to control at least the operation of at least one component of the HVAC system; and
   a controller interface device to be displaced between a mounted position and an unmounted position, the controller interface device being securely mounted to the enclosure when in the mounted position, the controller interface device being displaced away from the enclosure when in the unmounted position, and wherein the controller interface device is to receive communications from the controller relating to an aspect of the HVAC system at least when the controller interface device is in the unmounted position; and
   a mounting device having a first retainer member, a second retainer member, a first mount, and a second mount, the first retainer member coupled to a first side of the housing, the second retainer member coupled to a second side of the housing, the second retainer member to receive the second mount as the controller interface device is displaced to the mounted position;
   wherein the controller interface device is a handheld device, and wherein the controller interface device includes a housing, a display, and an input device, the display to display at least information relating to the communications received by the controller interface device from the controller.

2. The system of claim 1, wherein the controller interface device is to transmit communications to the controller.

3. The system of claim 2, wherein the controller interface device is placed in electronic communication with the controller through a cable, the cable having a length that does not restrict displacement of the controller interface device away from the enclosure while maintaining electronic communication of the controller to the controller interface device through the cable.

4. The system of claim 2, wherein the controller interface device is in wireless communication with the controller.

5. The system of claim 1, wherein, when the controller interface device is in the mounted position, the first retainer member is axially retained in position by the first mount and the second retainer member is axially retained in position by the second mount.

6. The system of claim 5, wherein the first mount is a first captive screw and the second mount is a second captive screw, and further wherein the first and second captive screws are electrically non-conductive.

7. The system of claim 1, wherein the first retainer member to be at least partially rotatable about the first mount as the controller interface device is displaced toward the mounted position.

8. An apparatus for a Heating, Ventilation, and Air Conditioning (HVAC) system, the apparatus comprising:
   a controller enclosed in a housing and in communication with at least one component of the HVAC system;
   a housing encompassing at least a portion of the controller;
   a controller interface device in communication with the controller;
   means for detachably retaining the controller interface device within the housing, the means including:
      a first retention member extending from a first side of the controller interface device, the first retention member for rotatable displacement of the controller interface device about a first mount as the controller interface device is displaced to a mounted position;
      a second retention member extending from a second side of the controller interface device, the second retention member to engage a second mount when the controller interface device is displaced to the mounted position, and wherein the first and second mounts are each coupled to the housing; and
   wherein the controller interface device is a handheld device, and wherein the controller interface device includes a display and an input device.

9. The system of claim 8, wherein the controller interface device is placed in electronic communication with the controller through a cable, the cable having a length that does not restrict displacement of the controller interface device away from the housing while maintaining electronic communication of the controller to the controller interface device through the cable.

10. The system of claim 9, wherein the controller interface device is structured to receive diagnostic information from one or more components of the Heating, Ventilation, and Air Conditioning (HVAC) system.

11. An apparatus comprising:
a controller enclosed in a housing and in communication with at least one of a refrigerant compressor, a furnace blower motor, a furnace ignition system, and a refrigerant condenser fan;
an enclosure that houses at least a portion of the controller;
a controller interface device having a display and a user input, the controller interface device being in communication with the controller, the controller interface device is a handheld device, and the controller interface device includes a display and an input device;
a first retention member extending from a first side of the controller interface device, the first retention member for rotatable displacement of the controller interface device about a first mount as the controller interface device is displaced to a mounted position; and
a second retention member extending from a second side of the controller interface device, the second retention member to engage a second mount when the controller interface device is displaced to the mounted position, and wherein the first and second mounts are each coupled to the housing; and
wherein the controller interface device is removably coupled to a mounting portion located within the enclosure, the controller interface device to remain in communication with the controller when the controller interface device is removed from the enclosure.

12. The apparatus of claim 11, wherein the mounting portion includes a first threaded fastener and a second threaded fastener, and wherein
the first retention member is a first slotted member structured to receive a first shaft portion of the first threaded fastener, the first slotted member for rotation about the first shaft portion; and
the second retention member is a second slotted member structured to receive a second shaft portion of the second threaded fastener in response to rotation of the first slotted member about the first shaft portion.

13. The apparatus of claim 12, wherein the first threaded fastener is a first captive screw having a first head, and the second threaded fastener is a second captive screw having a second head, the first head to press the first slotted member against the enclosure, the second head to press the second slotted member against the enclosure.

14. The apparatus of claim 13, wherein the enclosure is incorporated into an air conditioning unit, the air conditioning unit including the refrigerant compressor and a condenser.

15. The apparatus of claim 14, wherein the controller interface device is structured to be handheld and least a portion of the controller interface device is hermetically sealed.

16. The system of claim 15, wherein the controller interface device is placed in electronic communication with the controller through a cable, the cable having a length that does not restrict removal of the controller interface device away from the enclosure while maintaining electronic communication of the controller to the controller interface device through the cable.

17. The system of claim 15, wherein the controller interface device is in wireless communication with the controller.

\* \* \* \* \*